(12) United States Patent
Ye et al.

(10) Patent No.: US 8,611,435 B2
(45) Date of Patent: Dec. 17, 2013

(54) COMBINED SCHEME FOR INTERPOLATION FILTERING, IN-LOOP FILTERING AND POST-LOOP FILTERING IN VIDEO CODING

(75) Inventors: Yan Ye, San Diego, CA (US); Marta Karczewicz, San Diego, CA (US); Wei-Jung Chien, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 420 days.

(21) Appl. No.: 12/641,670

(22) Filed: Dec. 18, 2009

(65) Prior Publication Data

US 2010/0158103 A1    Jun. 24, 2010

Related U.S. Application Data

(60) Provisional application No. 61/140,026, filed on Dec. 22, 2008, provisional application No. 61/140,585, filed on Dec. 23, 2008, provisional application No. 61/220,947, filed on Jun. 26, 2009, provisional application No. 61/143,324, filed on Jan. 8, 2009.

(51) Int. Cl.
H04N 11/04    (2006.01)

(52) U.S. Cl.
USPC ............. 375/240.29; 375/240.26; 375/240.24

(58) Field of Classification Search
USPC ........................ 375/240.29, 240.26, 240.24
See application file for complete search history.

(56) References Cited

U.S. PATENT DOCUMENTS

| | | | |
|---|---|---|---|
| 6,272,177 B1 | 8/2001 | Murakami et al. | |
| 7,034,897 B2 * | 4/2006 | Alvarez et al. | 348/721 |
| 7,227,589 B1 * | 6/2007 | Yeo et al. | 348/721 |
| 7,242,819 B2 * | 7/2007 | Jiang | 382/300 |
| 7,561,623 B2 * | 7/2009 | Park et al. | 375/240.29 |
| 2001/0031097 A1 | 10/2001 | Mancuso et al. | |
| 2001/0036320 A1 * | 11/2001 | Tan et al. | 382/238 |
| 2003/0138150 A1 | 7/2003 | Srinivasan | |
| 2006/0126962 A1 * | 6/2006 | Sun | 382/268 |
| 2006/0215754 A1 * | 9/2006 | Buxton et al. | 375/240.12 |
| 2006/0262990 A1 | 11/2006 | Lee et al. | |

(Continued)

FOREIGN PATENT DOCUMENTS

| | | |
|---|---|---|
| EP | 1351513 | 10/2003 |
| EP | 1351513 A2 * | 10/2003 |

(Continued)

OTHER PUBLICATIONS

Pang et el., Optimum Loop Filter in Hybrid Coders, IEEE TranSaCtions on Circuits and systems for Video Technology, Apr. 1994, vol. 4 No. 2, pp. I58-167.*

(Continued)

*Primary Examiner* — Christopher S Kelley
*Assistant Examiner* — Deirdre Beasley
(74) *Attorney, Agent, or Firm* — Todd E. Marlette

(57) ABSTRACT

In one example, this disclosure describes filtering techniques for filtering of video blocks of a video unit. The filtering techniques may select one or more different types of filtering for each video block of the video unit based on various factors such as whether the video block is inter-coded or intra-coded, and whether adaptive interpolations were preformed during a motion compensation process during the encoding of the video block. When adaptive interpolations were performed, the adaptive interpolations may provide a level of filtering that renders additional filtering unnecessary or undesirable in some cases.

38 Claims, 10 Drawing Sheets

(56) References Cited

U.S. PATENT DOCUMENTS

| | | | |
|---|---|---|---|
| 2007/0160151 A1 | 7/2007 | Bolton et al. | |
| 2008/0056389 A1 | 3/2008 | Chiang et al. | |
| 2008/0075165 A1 | 3/2008 | Ugur et al. | |
| 2008/0267297 A1 | 10/2008 | Sampedro et al. | |
| 2009/0060368 A1* | 3/2009 | Drezner et al. | 382/261 |
| 2009/0097575 A1 | 4/2009 | Teng et al. | |

FOREIGN PATENT DOCUMENTS

| | | |
|---|---|---|
| JP | 2008289134 A * | 11/2008 |
| WO | 2008085109 A1 | 7/2008 |
| WO | 2009044356 A2 | 4/2009 |
| WO | 2009047182 A1 | 4/2009 |

OTHER PUBLICATIONS

Takeshi Chujoh et al: "Block-based Adaptive Loop Filter (VCEG-AI18)" ITU-SG16, Video Coding Experts Group Jul. 17, 2008, XP002597606 Berlin, DE Retrieved from the Internet: URL:http://wftp3.itu.int/av-arch/video-site/O807_Ber/VCEG-AI18.zip Annex A; figures 1,2.*

Wedi, T et al.: "Advances in Hybrid Video Coding (invited paper)" Visual Communications and Image Processing, vol. 6508, Jan. 30, 2007, SP030081113 San Jose, USA sections 3.2 and 5 figures 1, 12.*

Pang et el., Optimum Loop Filter in Hybrid Coders, IEEE TranSaCtions on Circuits and systems for Video Technology, Apr. 1994, vol. 4 No. 2, pp. 158-167.*

Takeshi Chujoh et al: "Block-based Adaptive Loop Filter (VCEG-A118)" ITU-SG16, Video Coding Experts Group Jul. 17, 2008 (Jul. 17, 2008), XP002597606 Berlin, DE Retrieved from the Internet: URL:http://wftp3.itu.int/av-arch/video-site/O807_Ber/VCEG-A118.zip Annex A; figures 1,2.*

Wedi, T et al.: "Advances in Hybrid Video Coding (invited paper)" Visual Communications and Image Processing, vol. 6508, Jan. 30, 2007 (Jan. 30, 2007), SP030081113 San Jose, USA sections 3.2 and 5 figures 1, 12.*

Hsu Y-F et al: "A New Adaptive Separable Median Filter for Removing Blocking Effects" IEEE Transactions on Consumer Electronics, vol. 39, No. 3, Aug. 1, 1993, pp. 510-513, XP000396326 IEEE Service Center, New York, NY, US ISSN: 0098-3063 DOI: 10.1109/30.234628.

International Search Report and Written Opinion—PCT/US2009/069124, International Search Authority—European Patent Office—Sep. 14, 2010.

Lee, Y L et al: "Loop-filtering and post-filtering for low bit-rates moving picture coding" IEEE Conference on Image Processing (ICIP99), Proceedings,, Oct. 24, 1999, pp. 94-98, XP010369215 Piscataway, NJ, USA DOI: 10.1109/ICIP.1999.821573 ISBN: 978-07803-5467-8 section 2.

Wedi, T et al: "Advances in hybrid video coding (Invited Paper)" Visual Communications and Image Processing, vol. 6508, Jan. 30, 2007, XP030081113 San Jose, USA sections 3.2 and 5 figures 1, 12. Communications and Image Processing, vol. 6508, Jan. 30, 2007 (Jan. 30, 2007), XP030081113 San Jose, USA sections 3.2 and 5 figures 1,12.

Liu et al., "An Area-Efficient and High-Throughput De-Blocking Filter for Muiti-Standard Video Applications," Department of Electronics Engineering, Nat. Chiao Tung Univ., Hsinchu, Taiwan, IEEE, 2006, pp. III-1044-III-1047.

Pang et al., "Optimum Loop Filter in Hybrid Coders," IEEE Transactions on Circuits and Systems for Video Technology, Apr. 1094, vol. 4, No. 2, pp. 158-167.

Tokunaga et al., "Adaptive interpolation-filter assignment which needs no additional bits using block motion and block image features," Transactions of the Institute of Electronics, information and Communication Engineers, Jul. 2005, vol. J88-D-II, No. 7, pp. 1313-1317, in Japanese with English Abstract.

Jung et al., "Performance evaluation of the KTA 1.2 software," ITU-T SG16/Q.5 VCEG-AE09, Marrakech, Morocco, Jan. 2007.

Vatis et al., "Comparison of complexity between two-dimensional non-separable adaptive interpolation filter and standard wiener filter," ITU-T SG16/Q.6 VCEG-AA11, Nice, France, Oct. 2005.

Wittmann et al., "Separable Adaptive Interpolation Filter," ITU-T SG16/Q.6 Doc. T05-SG16-C-0219, Geneva, Switzerland, Jun. 2007.

Rusanovskyy et al., "Adaptive Interpolation with Directional Filters," ITU-T SG16/Q.6 Doc. VCEG-AG21, Shenzhen, China, Oct. 2007.

Ye et al., "Enhanced Adaptive Interpolation Filter (E-AIF)," ITU-T SG16-Q.6 Doc. T05-SG16-C-0464, Geneva, Switzerland, Apr. 2008.

Chujoh et al., "Improvement of Block-based Adaptive Loop Filter (BALF)," ITU-T SG16/Q.6 Doc. VCEG-AJ13, San Diego, CA, Oct. 2008.

Karczewicz et al., "Post-filter hint SEI message extensions," ITU-T SG16/Q.6 Doc. VCEG-A134, Berlin, Germany, Jul. 2008.

Taiwan Search Report—TW098144376—TIPO—Dec. 5, 2012.

* cited by examiner

COMBINED SCHEME FOR INTERPOLATION FILTERING, IN-LOOP FILTERING AND POST-LOOP FILTERING IN VIDEO CODING This application claims the benefit of:
U.S. Provisional Application No. 61/140,026, filed on Dec. 22, 2008;
U.S. Provisional Application No. 61/140,585, filed on Dec. 23, 2008;
U.S. Provisional Application No. 61/143,324, filed on Jan. 8, 2009; and
U.S. Provisional Application No. 61/220,947, filed on Jun. 26, 2009,
the entire contents of which are incorporated herein by reference.

TECHNICAL FIELD

This disclosure relates to block-based video coding techniques used to compress video data and, more particularly, filtering techniques during block-based video coding.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital video devices implement video compression techniques, such as those described in MPEG-2, MPEG-4, or ITU-T H.264/MPEG-4, Part 10, Advanced Video Coding (AVC), in order compress video data. Video compression techniques perform spatial and temporal prediction to reduce or remove redundancy inherent in video sequences.

Block-based video compression techniques generally perform spatial prediction and/or temporal prediction. Intra-coding relies on spatial prediction to reduce or remove spatial redundancy between video blocks within a given coded unit, which may comprise a video frame, a slice of a video frame, or the like. In contrast, inter-coding relies on temporal prediction to reduce or remove temporal redundancy between video blocks of successive coded units of a video sequence. For intra-coding, a video encoder performs spatial prediction to compress data based on other data within the same coded unit. For inter-coding, the video encoder performs motion estimation and motion compensation to track the movement of corresponding video blocks of two or more adjacent coded units.

A coded video block may be represented by prediction information that can be used to create or identify a predictive block, and a residual block of data indicative of differences between the block being coded and the predictive block. In the case of inter-coding, one or more motion vectors can be used to identify the predictive block of data, while in the case of intra-coding, the prediction mode can be used to generate the predictive block. Both intra-coding and inter-coding may define several different prediction modes, which may define different block sizes and/or prediction techniques used in the coding. Additional types of syntax elements may also be included as part of encoded video data in order to control or define the coding techniques or parameters used in the coding process.

After block-based predictive coding, the video encoder may apply transform, quantization and entropy coding processes in order to further reduce the bit rate associated with communication of a residual block. Transform techniques may comprise discrete cosine transforms (DCTs) or conceptually similar processes, such as wavelet transforms, integer transforms, or other types of transforms. In a DCT process, as an example, the transform process converts a set of pixel values into transform coefficients, which may represent the energy of the pixel values in the frequency domain. Quantization is applied to the transform coefficients, and generally involves a process that limits the number of bits associated with any given transform coefficient. Entropy coding comprises one or more processes that collectively compress a sequence of quantized transform coefficients.

SUMMARY

This disclosure describes filtering techniques for filtering of video blocks of a video unit. The video unit, as examples, may comprise a video frame, or a slice or other portion of a video frame. The filtering techniques may select one or more different types of filtering for each video block of the video unit based on various factors such as whether the video block is inter-coded or intra-coded, and whether adaptive interpolations were preformed during a motion compensation process during the encoding of the video block. When adaptive interpolations were performed, the adaptive interpolations may provide a level of filtering that renders additional filtering unnecessary or undesirable in some cases.

In some cases, only one type of filtering is applied to any given video block of the video unit. For example, only one of adaptive interpolation filtering, post-loop filtering and in-loop filtering may be applied to any given video block. In this case, if an adaptive interpolation filter is applied during motion compensation, then post-loop filtering or in-loop filtering may be avoided, but if the adaptive interpolation filter is not applied during motion compensation, then one of post-loop filtering and in-loop filtering may be applied. In other cases, however, even following an adaptive interpolation, a post-loop filter may be applied for pixels of the video block associated with zero-value residual values, and an in-loop filter may be applied for pixels of the video block associated with non-zero residual values.

In one example, this disclosure describes a method of filtering one or more video blocks of a video unit during a video coding process. The method comprises determining whether a video block is inter-coded or intra-coded and applying a post-loop filter or an in-loop filter to the video block when the video block is intra-coded. When the video block is inter-coded, the method includes determining whether an adaptive interpolation filter was applied during a motion compensation process with respect to the video block, and when the video block is inter-coded, the method also includes determining whether to apply the post-loop filter or the in-loop filter to the video block based at least in part on whether the adaptive interpolation filter was applied.

In another example, this disclosure describes a video coder apparatus that filters video blocks of a video unit during a video coding process. The video coder apparatus comprises an adaptive interpolation filter, a post-loop filter, and an in-loop filter. The apparatus determines whether a video block is inter-coded or intra-coded, applies the post-loop filter or the in-loop filter to the video block when the video block is intra-coded, when the video block is inter-coded, determines whether the adaptive interpolation filter was applied during a motion compensation process with respect to the video block, and when the video block is inter-coded, determines whether to apply the post-loop filter or the in-loop filter to the video block based at least in part on whether the adaptive interpolation filter was applied.

In another example, this disclosure describes a device that filters video blocks of a video unit during a video coding process. The device comprises means for determining whether a video block is inter-coded or intra-coded, means for applying a post-loop filter or an in-loop filter to the video block when the video block is intra-coded, when the video block is inter-coded, means for determining whether an adaptive interpolation filter was applied during a motion compensation process with respect to the video block, and when the video block is inter-coded, means for determining whether to apply the post-loop filter or the in-loop filter to the video block based at least in part on whether the adaptive interpolation filter was applied.

The techniques described in this disclosure may be implemented in hardware, software, firmware, or any combination thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable storage medium comprising instructions that upon execution in a processor cause the processor to filter video blocks of a video unit during a video coding process. The instructions cause the processor to determine whether a video block is inter-coded or intra-coded, apply a post-loop filter or an in-loop filter to the video block when the video block is intra-coded, when the video block is inter-coded, determine whether an adaptive interpolation filter was applied during a motion compensation process with respect to the video block, and when the video block is inter-coded, determine whether to apply the post-loop filter or the in-loop filter to the video block based at least in part on whether the adaptive interpolation filter was applied.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
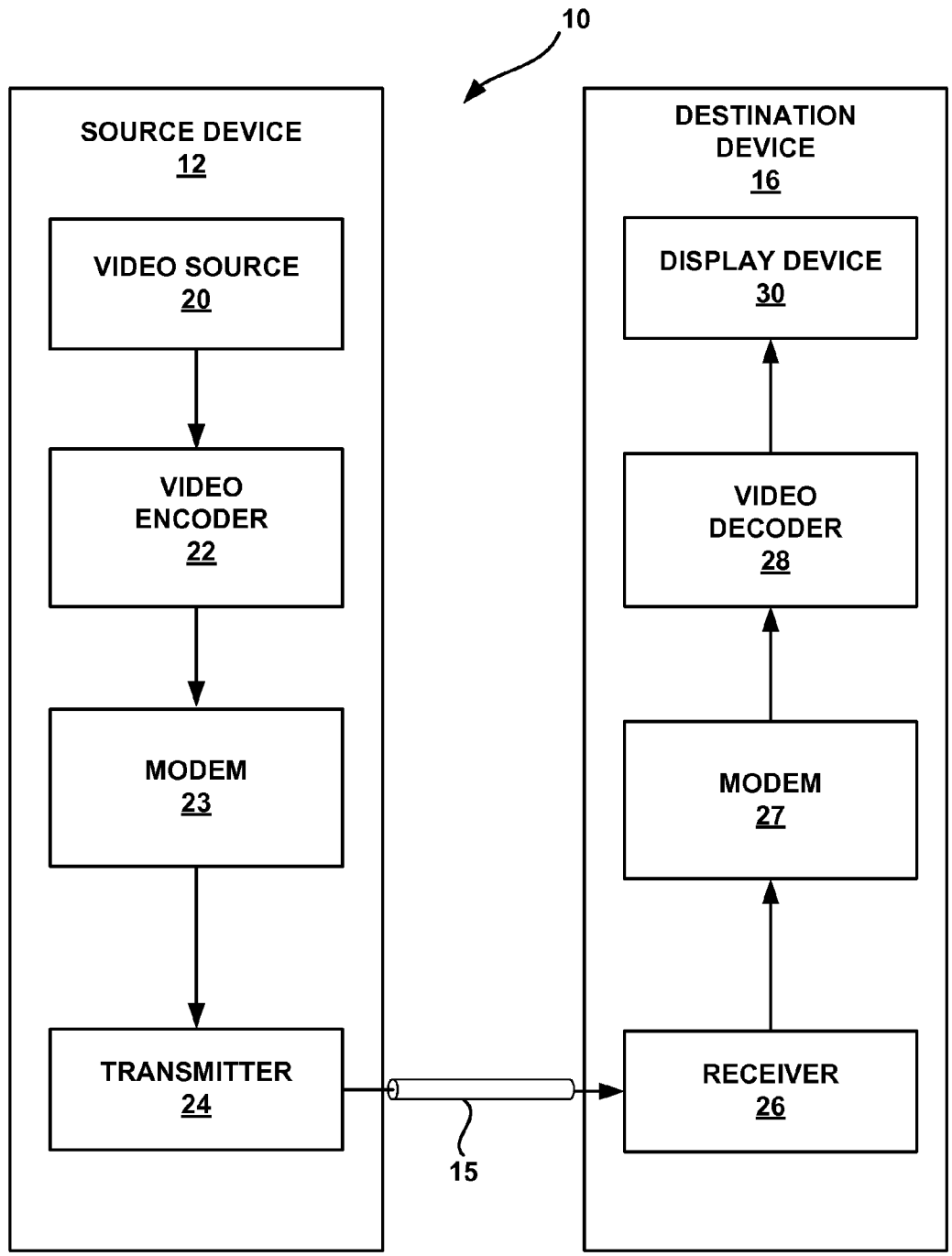
FIG. 1 is a block diagram illustrating a video encoding and decoding system that may implement one or more of the techniques of this disclosure.

This disclosure describes filtering techniques for filtering of video blocks of a video unit. The video unit, as examples, may comprise a video frame or a slice or another portion of a video frame. The filtering techniques may select one or more different types of filtering for each video block of the video unit based on various factors such as whether the video block is inter-coded or intra-coded, and whether adaptive interpolations were performed during a motion compensation process during the encoding of the video block. When adaptive interpolations were performed during motion compensation, for example, the adaptive interpolations may provide a level of filtering that renders additional filtering on reconstructed data unnecessary or undesirable in some cases. Adaptive interpolation may refer to interpolations in which interpolation filter coefficients are adaptively determined (as part of the encoding or decoding process) to produce desirable prediction data. The techniques of this disclosure may determine whether adaptive interpolation was performed, e.g., in contrast to fixed interpolation defined by fixed interpolation filter coefficients.

The techniques of this disclosure may help to improve filtering in video encoding or video decoding scenarios where multiple different types of filtering are supported. The techniques may achieve a desirable level of filtering by selecting among adaptive interpolation filtering, in-loop filtering and post loop filtering. Interpolation filtering is typically unrelated to in-loop filtering and post loop filtering, but this disclosure recognizes that adaptive interpolation filtering may achieve at least some of the same filtering effects as in-loop filtering and post loop filtering. At the same time, this disclosure recognizes undesirable effects that may occur when too much filtering is applied.

Interpolation filtering generally refers to a type of filtering that occurs during motion compensation in order to generate interpolated (or non-integer) prediction data. In this case, the prediction data used to predictively encode a video block may be interpolated to half-pixel or quarter-pixel precision (or other fractional pixel precision) based on integer pixel data of a previous or subsequent video unit in the video sequence. The interpolation filtering of this disclosure, in some examples, may comprise adaptive interpolation filtering, in which interpolation filter coefficients are adaptively determined to produce desirable prediction data. Adaptive interpolation may be contrasted with fixed interpolation in that with adaptive interpolation, filter coefficients are adaptively defined as part of the coding process, whereas with fixed interpolation, the filter coefficients that are predefined, such as by a video coding standard.

In-loop filtering and post-loop filtering are similar to one another in some respects, but are generally different than interpolation filtering in terms of the data being filtered. In particular, whereas interpolation filtering applies to predictive data that is used to predictively encode one or more video blocks, in-loop filtering and post-loop filtering are applied to reconstructed video blocks after the encoding or decoding process in order to smooth pixel variation, remove blockiness, or otherwise improve the final output video data.

With in-loop filtering, the filtering of reconstructed video data occurs in the coding loop, which means that the filtered data is stored by an encoder or a decoder for subsequent use in the prediction of subsequent image data. In contrast, with post loop filtering, the filtering of reconstructed video data occurs out of the coding loop, which means that unfiltered versions of the data are stored by an encoder or a decoder for subsequent use in the prediction of subsequent image data. Thus, with post-loop filtering, the filtering may be applied to create reconstructed video data, but such filtering is not applied to the data for purposes of storing such data for use in other predictive encoding. The in-loop filtering and the post-loop filtering of this disclosure may be adaptive in that the filtering coefficients applied in the filtering process are adaptively defined during the process.

Again, the techniques of this disclosure may select one or more different types of filtering for each video block of the video unit based on various factors such as whether the video block is inter-coded or intra-coded, and whether adaptive interpolations were preformed during a motion compensation process during the encoding of the video block. In some cases, only one type of filtering is applied to any given video block of the video unit. For example, in some cases, only one of adaptive interpolation filtering, post-loop filtering and in-loop filtering may be applied to any given video block. In such cases, if an adaptive interpolation filter is applied during motion compensation, then post-loop filtering or in-loop filtering may be avoided, but if an adaptive interpolation filter is not applied during motion compensation, then one of post-loop filtering and in-loop filtering may be applied.

In other cases, however, even following an adaptive interpolation, a post-loop filter may be applied for pixels of the video block associated with zero-value residual values, and an in-loop filter may be applied for pixels of the video block associated with non-zero residual values. Factors, such as whether the video block is inter-coded or intra-coded, and whether adaptive interpolations were preformed during a motion compensation process during the encoding of the video block, in this case, may still aid in defining the type of filtering that should be applied. In some examples, the in-loop filter and the post-loop filter may be mutually exclusive for any given pixel, or alternatively, for any given video block.

In this disclosure, the term "coding" refers to encoding or decoding. Similarly, term "coder" generally refers to any video encoder, video decoder, or combined encoder/decoder (codec). Accordingly, the term "coder" is used herein to refer to a specialized computer device or apparatus that performs video encoding or video decoding. The filtering techniques of this disclosure may be applicable to encoders or decoders. In some cases, filter syntax elements may be encoded into a bitstream in order to inform a decoder of the type of filtering that should be applied. This disclosure also defines a format or data structure for communicating encoded information that may improve the ability to encode filter information by encoding filter syntax information in a footer element that follows encoded video data (e.g., encoded coefficients) rather than in a header element that precedes the video data for a video unit.

FIG. 1 is a block diagram illustrating an exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 may comprise wireless communication device handsets, such as so-called cellular or satellite radiotelephones. The techniques of this disclosure, however, which apply more generally to video block and/or pixel filtering during video coding, are not necessarily limited to wireless applications or settings, and may be applied to non-wireless devices including video encoding and/or decoding capabilities.

In the example of FIG. 1, source device 12 may include a video source 20, a video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to determine whether a video block is inter-coded or intra-coded, apply a post-loop filter or an in-loop filter to the video block when the video block is intra-coded, when the video block is inter-coded, determine whether an adaptive interpolation filter was applied during a motion compensation process with respect to the video block, and when the video block is inter-coded, determine whether to apply the post-loop filter or the in-loop filter to the video block based at least in part on whether the adaptive interpolation filter was applied. Additional details of the filtering process that may be performed by video encoder 22 are described in greater detail below.

Similar filtering techniques may also be performed by video decoder 28 of destination device 16. That is, video decoder 28 may also be configured to determine whether a video block is inter-coded or intra-coded, apply a post-loop filter or an in-loop filter to the video block when the video block is intra-coded, when the video block is inter-coded, determine whether an adaptive interpolation filter was applied during a motion compensation process with respect to the video block, and when the video block is inter-coded, determine whether to apply the post-loop filter or the in-loop filter to the video block based at least in part on whether the adaptive interpolation filter was applied. In some cases, filtering syntax information is defined at video encoder 22 and communicated to video decoder 28 as part of an encoded bitstream sent from source device 12 to destination device 16. Indeed, this disclosure also contemplates formats for such filtering syntax information within an encoded video unit. For example, rather than provide filtering syntax information in a header element, this disclosure contemplates the use of a footer element, in which case the filtering syntax information would follow rather than precede the encoded video coefficients of a video unit. The footer element may be a separate footer file, or may be an element of a file that defines the encoded data for a video unit.

The illustrated system 10 of FIG. 1 is merely exemplary. The filtering techniques of this disclosure may be performed by any encoding or decoding devices. Source device 12 and destination device 16 are merely examples of coding devices that can support such techniques.

Video encoder 22 of source device 12 may encode video data received from video source 20 using the techniques of this disclosure. Video source 20 may comprise a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22.

Once the video data is encoded by video encoder 22, the encoded video information may then be modulated by modem 23 according to a communication standard, e.g., such as code division multiple access (CDMA) or another communication standard or technique, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas. Receiver 26 of destination device 16 receives information over channel 15, and modem 27 demodulates the information. Again, the video decoding process performed by video decoder 28 may include similar filtering techniques to those of video encoder 22.

Communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16.

Video encoder 22 and video decoder 28 may operate substantially according to a video compression standard such as the ITU-T H.264 standard, alternatively referred to as MPEG-4, Part 10, Advanced Video Coding (AVC). However, the techniques of this disclosure may be readily applied in the context of a variety of other video coding standards. Specifically, any standard that allows for filtering at the encoder or the decoder may benefit from the teaching of this disclosure.

Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

In some cases, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video playback, video broadcasting, or video telephony.

During the encoding process, video encoder 22 may execute a number of coding techniques or operations. In general, video encoder 22 operates on video blocks within individual video frames (or other independently coded units such as slices) in order to encode the video blocks. Frames, slices, portions of frames, groups of pictures, or other data structures may be defined as independently decodable units that include a plurality of video blocks. The video blocks within coded units may have fixed or varying sizes, and may differ in size according to a specified coding standard. In some cases, each video frame may include a series of independently decodable slices, and each slice may include a series of macroblocks, which may be arranged into even smaller blocks.

Macroblocks typically refer to 16 by 16 blocks of data. The ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. In this disclosure, the phrase "video blocks" refers to any size of video block. Moreover, video blocks may refer to blocks of video data in the pixel domain, or blocks of data in a transform domain such as a discrete cosine transform (DCT) domain, a domain similar to DCT, a wavelet domain, or the like. In most cases, however, the filtering of this disclosure may occur in the pixel domain.

Video encoder 22 may perform predictive coding in which a video block being coded is compared to a predictive frame (or other coded unit) in order to identify a predictive block. This process of predictive coding may be referred to as motion estimation and motion compensation. Motion estimation estimates video block motion relative to one or more predictive video blocks of one or more predictive frames (or other coded units). Motion compensation generates the desired predictive video block from the one or more predictive frames or other coded units. Motion compensation may include an interpolation process in which interpolation filtering is performed to generate predictive data at fractional precision. The techniques of this disclosure may exploit such interpolation filtering and balance interpolation filtering with later in-loop or post-loop filtering on the reconstructed video data. Specifically, when the interpolation filter coefficients are adaptively defined in the coding process (rather than using fixed filter coefficients or no interpolation filtering), such adaptively interpolation filtering may achieve similar filtering effects to the in-loop or post-loop filtering, thereby rendering such in-loop or post-loop filtering unnecessary or undesirable in some cases.

After generating the predictive block, the differences between the current video block being coded and the predictive block are coded as a residual block, and prediction syntax (such as a motion vector) is used to identify the predictive block. The residual block may be transformed and quantized. Transform techniques may comprise a DCT process or conceptually similar process, integer transforms, wavelet transforms, or other types of transforms. In a DCT process, as an example, the transform process converts a set of pixel values (e.g., residual values) into transform coefficients, which may represent the energy of the pixel values in the frequency domain. Quantization is typically applied on the transform coefficients, and generally involves a process that limits the number of bits associated with any given transform coefficient.

Following transform and quantization, entropy coding may be performed on the quantized and transformed residual video blocks. Syntax elements, such as filter syntax information and prediction vectors defined during the encoding, may also be included in the entropy coded bitstream. In general, entropy coding comprises one or more processes that collectively compress a sequence of quantized transform coefficients and/or other syntax information. Scanning techniques, such as zig-zag scanning techniques, are performed on the quantized transform coefficients in order to define one or more serialized one-dimensional vectors of coefficients from two-dimensional video blocks. The scanned coefficients are then entropy coded along with any syntax information, e.g., via content adaptive variable length coding (CAVLC), context adaptive binary arithmetic coding (CABAC), or another entropy coding process.

As part of the encoding process, encoded video blocks may be decoded to generate the video data used for subsequent prediction-based coding of subsequent video blocks. At this stage, filtering may be employed in order to improve video quality, and e.g., remove blockiness or other artifacts from decoded video. This filtering may be in-loop or post-loop. Again, with in-loop filtering, the filtering of reconstructed video data occurs in the coding loop, which means that the filtered data is stored by an encoder or a decoder for subsequent use in the prediction of subsequent image data. In contrast, with post-loop filtering the filtering of reconstructed video data occurs out of the coding loop, which means that unfiltered versions of the data are stored by an encoder or a decoder for subsequent use in the prediction of subsequent image data.

Encoder 22 may select filter coefficients for any or all of the interpolation filtering, in-loop filtering or post-loop filtering in a manner that promotes the video quality. Interpolation filter coefficients, for example, may be selected from pre-defined sets of coefficients, or may be adaptively defined to promote video quality. As an example, video encoder 22 may select or define a set of filter coefficients for a given coded unit such that the same filter coefficients are used for all video blocks of that coded unit. In some cases, video encoder 22 may apply several sets of filter coefficients and select the set that produces the best quality video or the highest levels of compression or highest video quality for a given coding rate.

Figure 2:
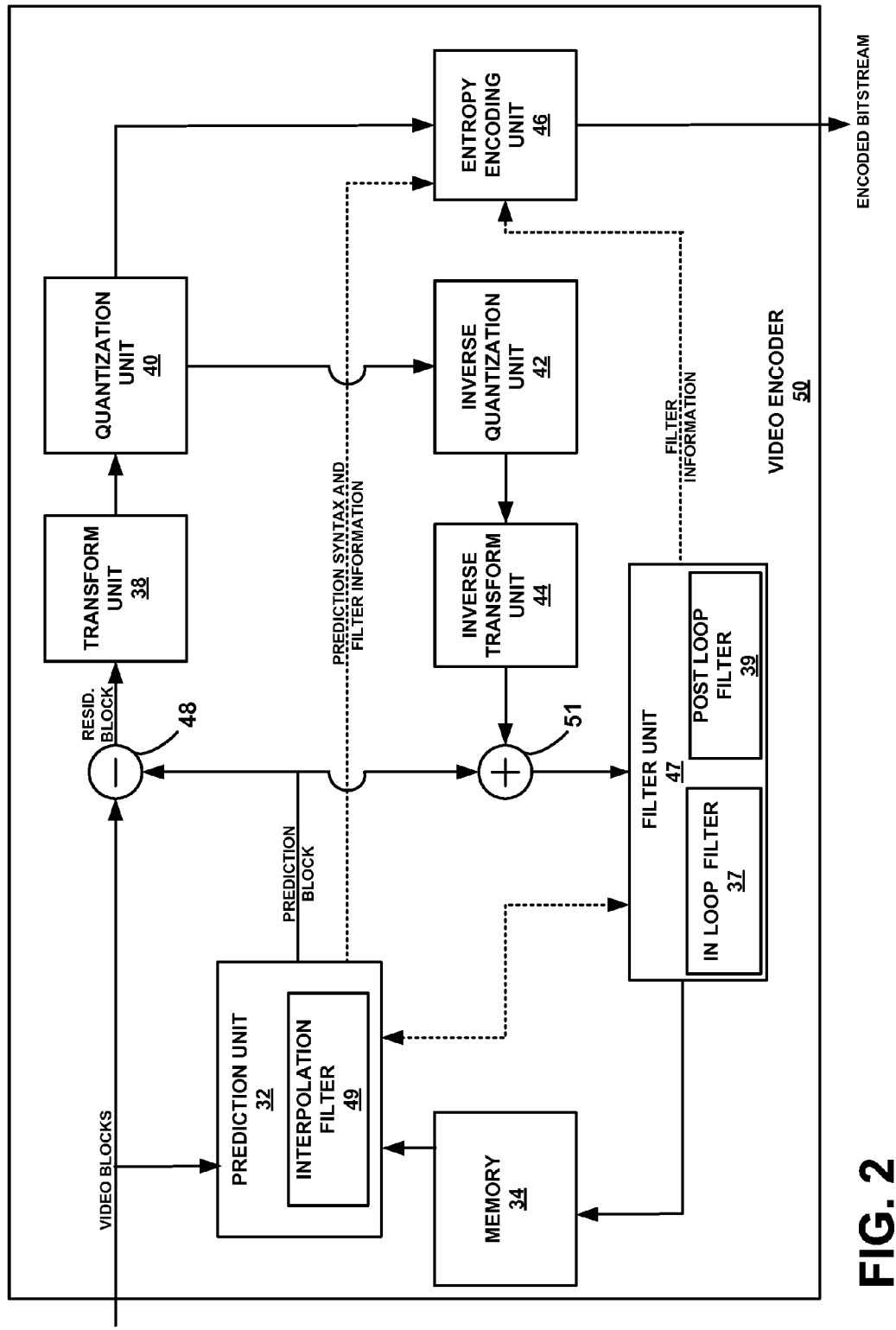
FIG. 2 is a block diagram illustrating an exemplary video encoder consistent with one or more examples of this disclosure.

FIG. 2 is a block diagram illustrating a video encoder 50 consistent with this disclosure. Video encoder 50 may correspond to video encoder 22 of device 20, or a video encoder of a different device. As shown in FIG. 2, video encoder 50 includes a prediction unit 32, adders 48 and 51, and a memory 34. Video encoder 50 also includes a transform unit 38 and a quantization unit 40, as well as an inverse quantization unit 42 and an inverse transform unit 44. Video encoder 50 also includes an entropy coding unit 46, and a filter unit 47. Filter unit 47 and prediction unit 32 collectively perform filtering consistent with this disclosure. In particular, prediction unit 32 may perform any interpolation filtering necessary for motion compensated interpolations of video blocks to sub-pixel resolution. Filter unit 47 may perform in-loop or post loop filtering on a video block basis or on an individual pixel basis as described herein. The techniques of this disclosure may define the level of filtering applied in the encoding process by considering the collective effect of interpolation filtering and post-loop or in-loop filtering.

More generally, during the encoding process, video encoder 50 receives a video block to be coded, and prediction unit 32 performs predictive coding techniques. For inter coding, prediction unit 32 compares the video block to be encoded to various blocks in one or more video reference frames or slices in order to define a predictive block. For intra coding, prediction unit 32 generates a predictive block based on neighboring data within the same coded unit. Prediction unit 32 outputs the prediction block and adder 48 subtracts the prediction block from the video block being coded in order to generate a residual block.

For inter coding, prediction unit 32 may comprise motion estimation and motion compensation units that identify a motion vector that points to a prediction block and generates the prediction block based on the motion vector. Typically, motion estimation is considered the process of generating the motion vector, which estimates motion. For example, the motion vector may indicate the displacement of a predictive block within a predictive frame relative to the current block being coded within the current frame. Motion compensation is typically considered the process of fetching or generating the predictive block based on the motion vector determined by motion estimation. For intra coding, prediction unit 32 generates a predictive block based on neighboring data within the same coded unit. One or more intra-prediction modes may define how an intra prediction block can be defined.

Motion compensation for inter-coding may include interpolations to sub-pixel resolution. Interpolation filter 49 may represent an adaptively defined filter consistent with this disclosure. However, interpolation filter 49 may also represent a combination of an adaptively defined filter, a pre-defined filter, or possibly a set of filters that filter predictive data in order to generate interpolated predictive data. The interpolated predictive data, for example, may be interpolated to half-pixel resolution, quarter-pixel resolution, or even finer resolution. This permits motion estimation to estimate motion of video blocks to such sub-pixel resolution.

After prediction unit 32 outputs the prediction block (which may include interpolation filtering by interpolation filter 49), and after adder 48 subtracts the prediction block from the video block being coded in order to generate a residual block, transform unit 38 applies a transform to the residual block. The transform may comprise a discrete cosine transform (DCT) or a conceptually similar transform such as that defined by the H.264 standard. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

Quantization unit 40 then quantizes the residual transform coefficients to further reduce bit rate. Quantization unit 40, for example, may limit the number of bits used to code each of the coefficients. After quantization, entropy coding unit 46 may scan and entropy encode the data. For example, entropy coding unit 46 may scan the quantized coefficient block from a two-dimensional representation to one or more serialized one-dimensional vectors. The scan order may be pre-programmed to occur in a defined order (such as zig-zag scanning or another pre-defined order), or possibly adaptive defined based on previous coding statistics. Following this scanning process, entropy encoding unit 46 encodes the quantized transform coefficients (along with any syntax elements) according to an entropy coding methodology, such as context adaptive variable length coding (CAVLC) or context adaptive binary arithmetic coding (CABAC), to further compress the data. Syntax elements included in the entropy coded bitstream may include prediction syntax from prediction unit 32, such as motion vectors for inter coding or prediction modes for intra coding. Syntax elements included in the entropy coded bitstream may also include filter information from filter unit 47 and prediction unit 32, which can be encoded in the manner described herein.

CAVLC is one type of entropy coding technique supported by the ITU H.264/MPEG4, AVC standard, which may be applied on a vectorized basis by entropy coding unit 46. CAVLC uses variable length coding (VLC) tables in a manner that effectively compresses serialized "runs" of transform coefficients and/or syntax elements. CABAC is another type of entropy coding technique supported by the ITU H.264/MPEG4, AVC standard, which may be applied on a vectorized basis by entropy coding unit 46. CABAC may involve several stages, including binarization, context model selection, and binary arithmetic coding. In this case, entropy coding unit 46 codes transform coefficients and syntax elements according to CABAC. Many other types of entropy coding techniques also exist, and new entropy coding techniques will likely emerge in the future. This disclosure is not limited to any specific entropy coding technique.

Following the entropy coding by entropy encoding unit 46, the encoded video may be transmitted to another device or archived for later transmission or retrieval. Again, the encoded video may comprise the entropy coded vectors and various syntax, which can be used by the decoder to properly configure the decoding process. Inverse quantization unit 42 and inverse transform unit 44 apply inverse quantization and inverse transform, respectively, to reconstruct the residual block in the pixel domain. Summer 51 adds the reconstructed residual block to the prediction block produced by prediction unit 32 to produce a reconstructed video block for storage in memory 34. Prior to such storage, however, filter unit 47 may apply filtering to the video block to improve video quality. Such filtering by filter unit 47 may reduce blockiness or other artifacts. Moreover, filtering may improve compression by generating predictive video blocks that comprise close matches to video blocks being coded.

Again, filter unit 47 may support at least two different types of filtering. Filter unit 47 may include an in-loop filter 37 and a post-loop filter 39, which may actually be the same or similar filters. If filter unit 47 performs in-loop filtering, after such filtering, the reconstructed video block may be used by prediction unit 32 as a reference block for motion estimation to inter-code a block in a subsequent video frame or other coded unit. If filter unit 47 performs post-loop filtering, memory 34 may store an unfiltered version of the reconstructed video block, and the unfiltered version of the reconstructed video block may be used by prediction unit 32 as a reference block to inter-code a block in a subsequent video frame or other coded unit The filtering by filter unit 47 may include filter coefficient selection in a manner that promotes the video quality. For example, filter unit 47 may select filter coefficients from pre-defined sets of coefficients, or may adaptively define the filter coefficients in order to promote video quality or improved compression. Filter unit 47 may select or define a set of filter coefficients for a given coded unit such that the same filter coefficients are used for all video blocks of that coded unit, or in some cases, may apply different filters to different pixels of a given video block. In some cases, filter unit 47 may apply several sets of filter coefficients and select the set that produces the best quality video.

In accordance with this disclosure, filter unit 47 and prediction unit 54 perform filtering in a collective fashion. In particular, the decision of whether to perform filtering with filter unit 47, and the decision of whether to apply the in-loop filter 37 or the post loop filter 39 for such filtering may depend at least in part on whether interpolation filter 49 applied adaptive interpolation filtering during motion compensation. In this way, the techniques of this disclosure may help to avoid the over-filtering of data, which could possibly degrade video quality. Also, the techniques may help to avoid the propagation of filtering artifacts that might be caused by in-loop filtering in some cases. Additional details of the filtering decisions that may be performed by video encoder 50 are described in greater detail below.

Figure 3:
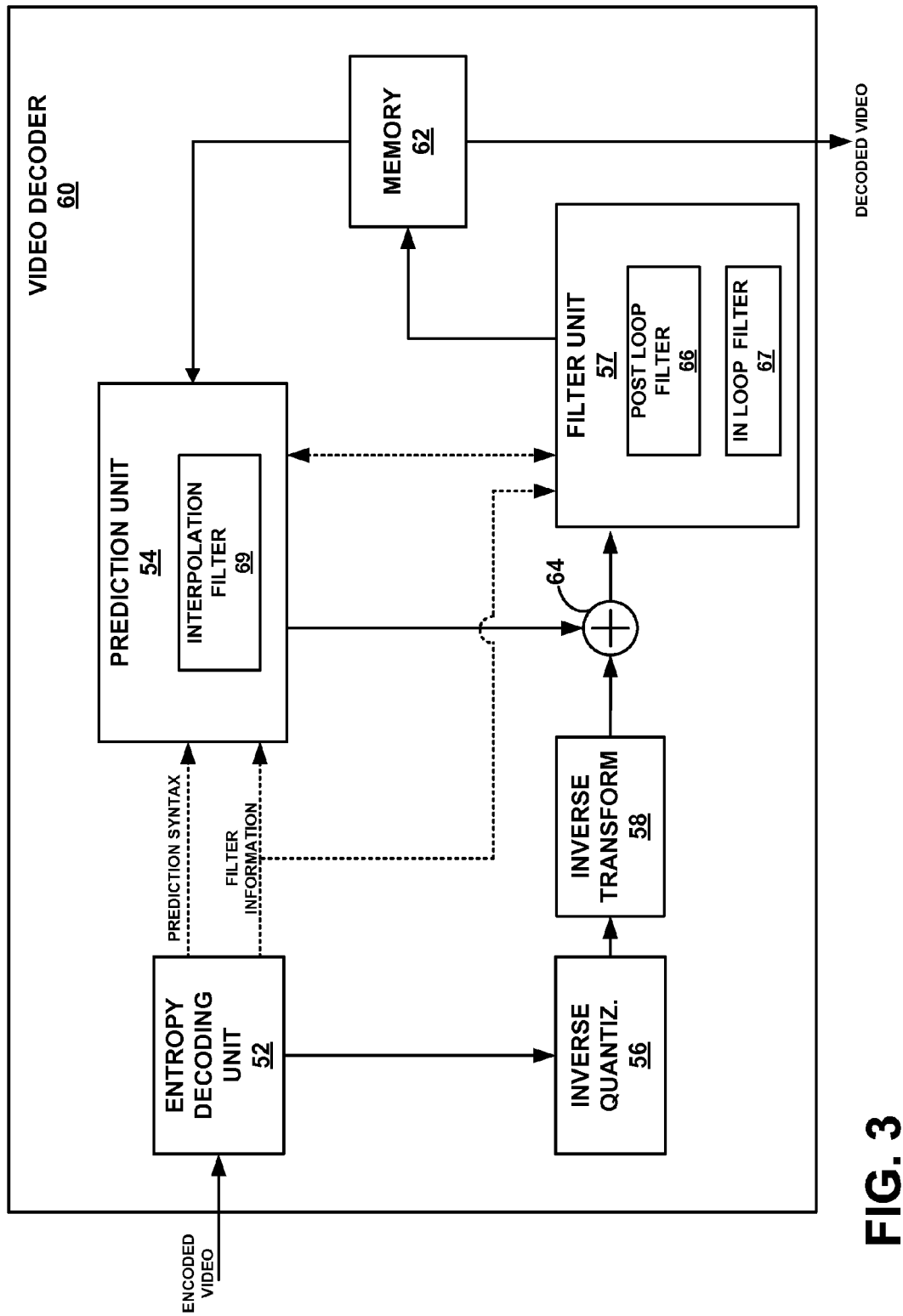
FIG. 3 is a block diagram illustrating an exemplary video decoder consistent with one or more examples of this disclosure.

FIG. 3 is a block diagram illustrating an example of a video decoder 60, which decodes a video sequence that is encoded in the manner described herein. The filtering techniques of this disclosure may be performed by video decoder 60 in some examples. The received video sequence may comprise an encoded set of image frames, a set of frame slices, a commonly coded group of pictures (GOPs), or a wide variety of coded video units that include encoded video blocks and syntax information to define how to decode such video blocks.

Video decoder 60 includes an entropy decoding unit 52, which performs the reciprocal decoding function of the encoding performed by entropy encoding unit 46 of FIG. 2. In particular, entropy decoding unit 52 may perform CAVLC or CABAC decoding, or any other type of entropy decoding used by video encoder 50. Entropy decoded video blocks in a one-dimensional serialized format may be converted from one or more one-dimensional vectors of coefficients back into a two-dimensional block format. The number and size of the vectors, as well as the scan order defined for the video blocks may define how the two-dimensional block is reconstructed. Entropy decoded prediction syntax may be sent from entropy decoding unit 52 to prediction unit 54, and entropy decoded filter information may be sent from entropy decoding unit 52 to filter unit 57.

Video decoder 60 also includes a prediction unit 54, an inverse quantization unit 56, an inverse transform unit 58, a memory 62, and a summer 64. In addition, video decoder 60 also includes a filter unit 57 that filters the output of summer 64. Consistent with this disclosure, filter unit 57 may receive entropy decoded filter information and may apply in loop or post loop filtering consistent with this disclosure. As with video encoder 50, video decoder 60 includes a prediction unit 54 and a filter unit 57. Prediction unit 54 of video decoder may include motion compensation elements including an interpolation filter 69, which may represent an adaptively defined filter and possibly one or several additional filters. Filter unit 57 may support both post-filtering and in-loop filtering. Filter unit 57 is shown as including a post-loop filter 66 and an in-loop filter 67, although these components could possibly be combined to a large extent.

As with video encoder 50, in video decoder 60, filter unit 57 and prediction unit 54 perform filtering in a collective fashion. In particular, the decision of whether to perform filtering with filter unit 57 and the decision of whether to apply the in-loop filter 67 or the post-loop filter 66 for such filtering may depend at least in part on whether interpolation filter 69 applied adaptive interpolation filtering during motion compensation of the decoding process. In this way, the techniques of this disclosure may improve video quality.

A wide variety of video compression technologies and standards perform spatial and temporal prediction to reduce or remove the redundancy inherent in input video signals. As explained above, an input video block is predicted using spatial prediction (i.e. intra prediction) and/or temporal prediction (i.e. inter prediction or motion estimation). The prediction units described herein may include a mode decision module (not shown) in order to choose a desirable prediction mode for a given input video block. Mode selection may consider a variety of factors such as whether the block is intra or inter coded, the prediction block size and the prediction mode if intra coding is used, and the motion partition size and motion vectors used if inter coding is used. A prediction block is subtracted from the input video block, and transform and quantization are then applied on the residual video block as described above. The quantized coefficients, along with the mode information, are entropy encoded to form a video bitstream. The quantized coefficients may also go through inverse quantization and inverse transform to form the reconstructed residual block, which can be added back to the prediction video block (intra predicted block or motion compensated block depending on the coding mode chosen) to form the reconstructed video block. An in-loop or post-loop filter may be applied to reduce the visual artifacts in the reconstructed video signal. The reconstructed video block is finally stored in the reference frame buffer (i.e., memory) for use of coding of future video blocks.

In H.264/AVC, directional intra prediction may be used in spatial prediction. For 4×4 and 8×8 luminance video blocks, nine different prediction modes may be used, while for 16×16 luminance blocks and chrominance blocks, 4 prediction modes may be used. For temporal prediction, motion estimation may be carried out to track the movement of video objects. Motion estimation may be done on blocks of variable sizes, for example, 16×16, 16×8, 8×16, 8×8 or smaller block sizes. The object displacement as the outcome of motion estimation may have half- or quarter-pixel precisions (or any finer precisions), which allows the video coder to track motion field in higher precision than integer-pixel locations and often obtain a better prediction block. When motion vectors with fractional pixel values are used, interpolation operations are carried out as described herein. For such interpolations in accordance with the H.264/AVC standard, a 6-tap Wiener filter with tap coefficients [1-5 20 20-5 1] and a bilinear filter may be used for motion compensation interpolations.

The ITU-T SG16/Q.6/VCEG (Video Coding Expert Group) committee is currently exploring coding technologies that offer higher coding efficiency than H.264/AVC. Such exploration is done in the KTA (Key Technology Areas) forum and other places. One of the coding tools that has been adopted into KTA is called an adaptive interpolation filter (AIF). AIF may offer coding gains over the current H.264/AVC filtering techniques, especially on video sequences with high resolution (e.g., 1080 progressive scan). In some AIF schemes, a two-dimensional (2D) non-separable interpolation filter may be analytically calculated for each video frame by substantially minimizing the prediction error energy. This may help to address aliasing effects, quantization and motion estimation errors, camera noise, or other factors that are contained in the original and reference video signal. In some cases, a set of analytically derived adaptive filter coefficients for each frame may themselves be predicted, quantized, coded, and sent in the video bitstream.

In addition to a two-dimensional (2D) non-separable AIF (NS-AIF), other AIF schemes may also be used to define interpolation filter coefficients or in-loop or post loop filter coefficients. Other types of AIF schemes may include a separable AIF (S-AIF), a directional AIF (DAIF), and an enhanced AIF (E-AIF). All of these AIF schemes may follow the same general analytical process to adaptively derive the filter coefficients for each frame by substantially minimizing the prediction error energy or resultant residual video blocks. These adaptively derived filter coefficients may be predicted, quantized, and sent in the bitstream.

The difference among different AIF schemes lies in the use of different filter structure, e.g., whether the filter is separable or non-separable, whether a full-pel filter is used, whether any filter offset is supported, or other factors. Also, different filter supports, such as horizontal filter supports, vertical filter supports, diagonal filter supports, radial filter supports may also be used. Symmetry may also be exploited in order to reduce the amount of data need to communicate filter coefficient. With symmetry, for example, a set of coefficients [−X, −Y, −Z, Z, Y, X] may be communicated by sending coefficients X, Y and Z, and deriving −X, −Y and −Z based on symmetry. Filter coefficients may also be predictively encoded, e.g., based on known filters or previously encoded filters.

Another coding tool that may be used is a block-based adaptive loop filter (BALF). Before storing the reconstructed video block in the reference frame store, BALF calculates and applies an adaptive in-loop filter (after the deblocking filter). With BALF, the loop filter coefficients may be adaptively calculated for each frame (or other coded unit) and sent in the bitstream. Whether or not the adaptive loop filter (ALF) is applied on a given video block may also be signaled in the bitstream. The filter units described in this disclosure may perform BALF-style filtering, but may select between in-loop or post loop. De-block filtering may also be part of the filter units described herein, or could be separated from BALF-style filtering. For example, de-block filtering could be performed prior to BALF-style in-loop or post-loop filtering.

This disclosure, in some cases, concerns video coding that performs both AIF and BALF. When AIF is used, the motion compensation block may apply adaptive interpolation filters rather than fixed interpolation filters. The adaptive filter coefficients, in this case, may be specified in the bitstream. As mentioned above, BALF-style filters may be placed after a deblocking filter as the last step of a decoding process of the video encoder or the video decoder before the video is stored and/or displayed. Thus, with respect to FIGS. 2 and 3, if filter units 37 and 57 perform BALF-style filtering, there may also be de-block filters (not shown) that are located within filter units 37 and 57. BALF may be one example of a more general adaptive loop filtering, in which signals are sent to indicate whether to apply the adaptive loop filter on part or all of the video blocks in the bitstream. Adaptive loop filters may be placed in-loop or out-of-loop, consistent with this disclosure. Adaptive post filtering (APF) may refer to post-loop filtering in which the filter coefficients are adaptively defined. When an adaptive filter is placed out of the coding loop, the filtered frame is only used for display purposes and not used as reference frame for coding of future video frames. In some cases, a decoder may choose to not apply the adaptive filter, especially when it runs out of computing cycles to do so in the decoding of a given video sequence. Thus, in addition to the contingencies described herein, an encoder or decoder could always suspend post-loop filtering if there was not enough computing cycles to do so within a given period of time.

Adaptive filters used in AIF are located at different stages of the coding relative to adaptive filters used for ALF or APF. In particular, while AIF is applied at the stage of motion compensation to improve inter prediction accuracy, ALF or APF is placed near the end of the coding process to reduce quantization noise and coding artifacts within the reconstructed video block. With adaptive filtering, this disclosure contemplates the combination of filtering decisions with respect to AIF and ALF or APF in order to achieve improvements in coding efficiency. However, a simple combination of AIF and ALF/APF means that many pixels in the video frame may be filtered twice, first by AIF and then by ALF/APF. In this case, the complexity of such a system may be very high, particularly if ALF/APF uses large filters. Some BALF schemes, for example, may use non-separable 9×9 filters, which are relatively large.

In some examples, for each possible full-pel or sub-pel position supported by motion compensation, a filter flag may be sent in the bitstream to indicate whether an adaptive filter should be used for this position. For systems that support half-pixel and quarter-pixel interpolations, for example, there may be 16 possible pixel positions associated with each integer pixel, one integer pixel position, three half-pixel positions, and twelve quarter pixel positions. For a given full-pel or sub-pel position p, p∈{FP, a . . . o}, an AIFflag(p) may specify whether an adaptive interpolation filter should be used for the position p. In this case, if AIFflag(p)=1, then an adaptive filter may be sent in the bitstream and used to interpolate prediction blocks with motion vectors corresponding to position p. Otherwise, if AIFflag(p)=0, a fixed interpolation filter (e.g., the 6-tap filter used in H.264) may be used instead.

For the full-pel position, if AIFflag(FP) is 0, no filtering may be applied if the motion vectors have full-pel precision. Instead, the prediction block may be obtained by directly copying from a reference frame at the corresponding location identified by the motion vector. In some AIF schemes, a full-pel adaptive filter is not used, and for these AIF schemes, the value of AIFflag(FP) may be effectively always set to 0.

When a particular AIFflag(p) (p∈{FP, a . . . o}) is set to 1, the adaptive interpolation filter for motion vectors corresponding to the position p may be used. This means that the prediction error energy was substantially minimized during the motion compensation stage for video blocks that have motion vectors corresponding to the position p. For these video blocks, application of ALF or APF at the later stage of coding flow may become less essential. However, for the remaining inter-coded video blocks that have motion vectors corresponding to position p for which AIFflag(p)=0, application of ALF or APF at the later stage of coding flow may help to reduce coding artifacts and/or coding noise. Furthermore, AIF may only be applicable to inter-coded video blocks, and may have little or no effect on the intra-coded video blocks.

Intra-coded video blocks may make up a significant portion of the video frame in video sequences that contain fast and/or irregular motion. In addition, intra-coded video blocks may make up a significant portion of the video frame in video sequences when temporal distance between the current frame and the reference frame is large, such as when a so-called hierarchical B prediction structure is used (where B refers to a "bi-directional" frame or slice that is predicted base on two or more reference frames or slices). For the intra-coded video blocks, the application of ALF or APF may also be desirable to reduce coding artifacts and coding noise.

In some aspects of this disclosure, a relatively low-complexity combination of AIF and ALF/APF is proposed. In some examples, this disclosure provides that ALF/APF may only be applied to video blocks for which AIF has not been applied. In this case, for example, the video blocks for which AIF is not applied may include inter-coded video blocks that have motion vectors corresponding to position p for which AIFflag(p) is 0, and may also include all intra-coded video blocks. Such a combination may significantly reduce system complexity as each pixel in the frame is filtered at most once, while a more naïve combination of AIF and ALF/APF may filter each pixel in the frame up to twice.

Figure 4:
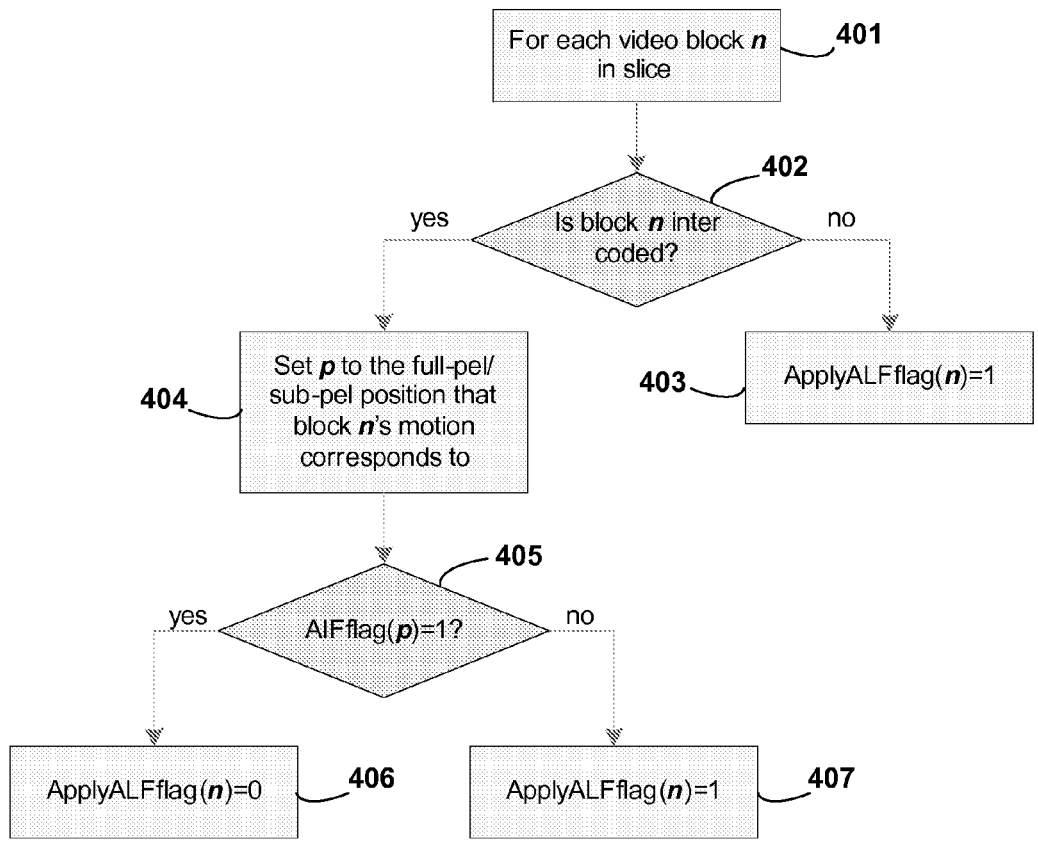
FIG. 4 is a flow diagram illustrating a technique for selecting between adaptive in-loop filtering and adaptive post-loop filtering, consistent with examples of this disclosure.

FIG. 4 is a flow diagram illustrating one technique for selecting between adaptive in-loop filtering and adaptive post-loop filtering, consistent with examples of this disclosure. This technique may be performed by a video coder, such as video encoder 22 or a video decoder 28 shown in FIG. 1. In this case, for each video block n of a slice or other coded unit (401), the video coder determines whether the block n is inter coded (402). If not ("no" 402), ALFflag(n)=1 is applied, meaning that ALF/APF will be applied to that block (403). If so ("yes" 402), the video coder may set p to the pixel position (e.g., one of 16 possible integer or sub-integer positions) corresponding to the motion of block n (404). The video coder may then check the value of AIFflag(p) for the set position of p (405). If, for the set position of p, the AIFflag(p)=1 ("yes" 405), then ALFflag(n)=0 is applied (406), meaning that ALF/APF will not be applied to that block. However, if for the set position of p, the AIFflag(p)=0 ("no" 405), then ALFflag(n)=1 is applied (407), meaning that ALF/APF will be applied to that block.

Figure 5:
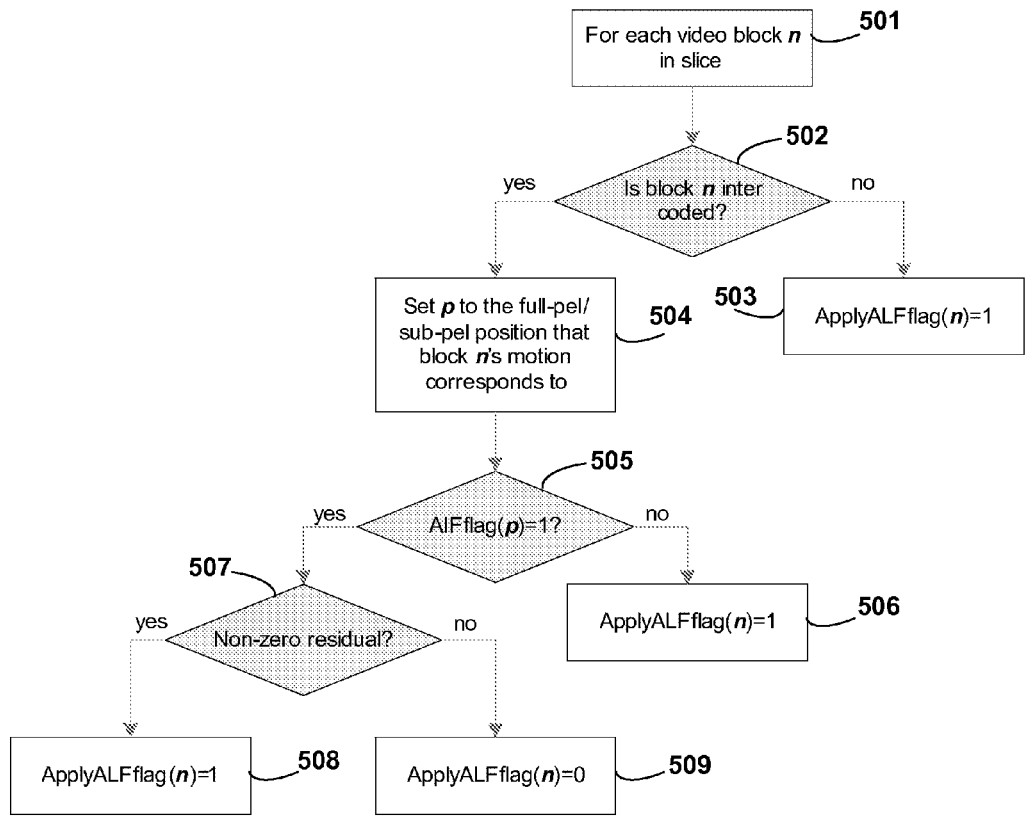
FIG. 5 is a flow diagram illustrating a technique for illustrating one technique for reconstruction of an inter-coded video block that includes at least one non-zero residual value consistent with examples of this disclosure.

FIG. 5 is a flow diagram illustrating a technique for illustrating one technique for reconstruction of an inter-coded video block that includes at least one non-zero residual value consistent with examples of this disclosure. This technique may be performed by a video coder, such as video encoder 22 or a video decoder 28 shown in FIG. 1. As shown in FIG. 5, for each video block n of a slice or other coded unit (501), the video coder determines whether the block n is inter coded (502). If not ("no" 502), ALFflag(n)=1 is applied, meaning that ALF/APF will be applied to that block (503). If so ("yes" 502), the video coder may set p to the pixel position (e.g., one of 16 possible integer or sub-integer positions) corresponding to the motion of block n (504). The video coder may then check the value of AIFflag(p) for the set position of p (505). If, for the set position of p, the AIFflag(p)=0 ("no" 505), then ALFflag(n)=1 is applied (506), meaning that ALF/APF will be applied to that block.

In the Example of FIG. 5, if, for the set position of p, the AIFflag(p)=1 ("yes" 505), then the video coder proceeds to the pixel level of the video block to determine whether the block includes any non-zero residual values (507). In this case, if the block include non-zero residual values ("yes" 507), then ALFflag(n)=1 is applied (508), meaning that ALF/APF will be applied to that block. However, if the block does not include any non-zero residual values ("no" 507), then ALFflag(n)=0 is applied (509), meaning that ALF/APF will not be applied to that block. The decision process of FIG. 5 may result in a higher number of video blocks with ApplyALFflag=1 relative to the process of FIG. 4. It may also result in each pixel being filtered more than one time on average, although the average number of filtering operations per pixel using the process of FIG. 5 would still be less than the number of filter operations required if a more naïve combination of AIF and ALF/APF were applied.

Figure 6:
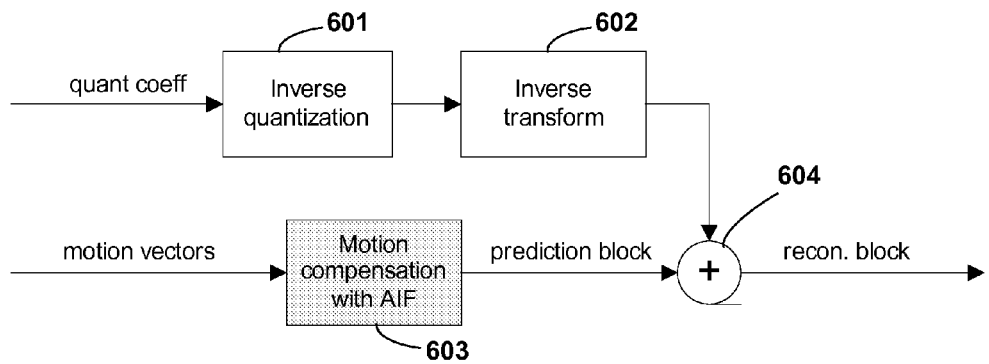
FIG. 6 is a block diagram illustrating a technique for one technique for reconstruction of an inter-coded video block that includes at least one non-zero residual value consistent with examples of this disclosure.

FIG. 6 is a block diagram illustrating a technique for one technique for reconstruction of an inter-coded video block that includes at least one non-zero residual value consistent with examples of this disclosure. One benefit of using the decision process of FIG. 5 may be recognized from the block-based video decoding elements shown in FIG. 6, including an inverse quantization unit 601, an inverse transform unit 602 a motion compensation unit 603 and an adder 604. These components may correspond to components of video encoder 50 or video decoder 60 shown in FIGS. 2 and 3, respectively. As shown in FIG. 6, even if the motion prediction error energy has been minimized during motion compensation by the use of AIF filters, after the addition of non-zero residual, the reconstructed block may still contain a certain level of coding noise. In this case, even if AIF has been applied, it may be beneficial to still apply ALF or APF at the later stage of coding.

Figure 7:
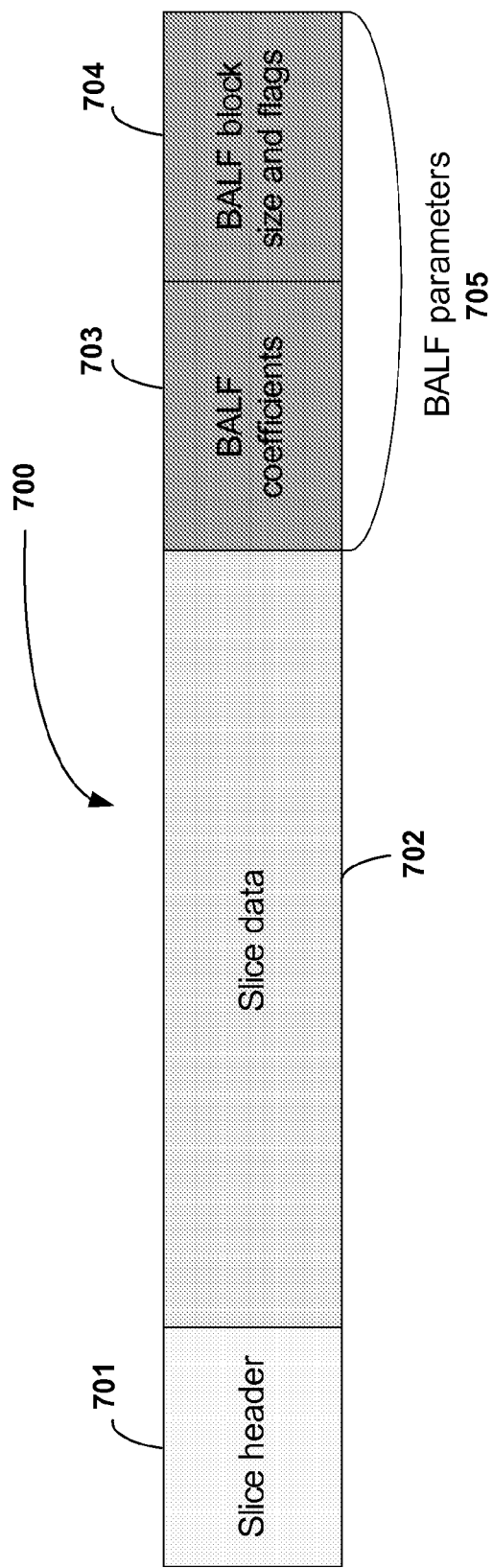
FIG. 7 is a conceptual diagram illustrating a data structure of a video unit for communicating filter information consistent with one or more examples of this disclosure.

With BALF, a video frame or slice may be partitioned into blocks of various sizes, which may be referred to as BALF blocks. Such BALF blocks may have various sizes such as 8×8, 16×16, 32×32, 64×64 or other sizes. The size of the BALF blocks may be signaled in the bitstream as a part of a set of encoded BALF parameters, which may be part of filtering syntax information. For each BALF block, a 1-bit flag alf_blk_flag may be sent to indicate whether ALF is applied. If alf_blk_flag is 1, then all pixels in the BALF block may be filtered using the adaptive loop filter. Otherwise, if alf_blk_flag=0, pixels in the BALF block may not be filtered. In some examples, the BALF parameters may include adaptive filter coefficients, the BALF block size and alf_blk_flag for all BALF blocks within a coded unit. Moreover, as shown in FIG. 7, such BALF parameters may be located in a footer element 705 rather than header element 701 for a coded unit.

Locating BALF parameters in a header element may yield the following issues.

1. Locating BALF parameters in a header element could make derivation of the BALF parameters more difficult. In this case, the BALF parameters may not be derived until after the entire video slice has been coded. Therefore, after the BALF parameters are derived, the bitstream handler (which may be part of an entropy encoder) may need to insert the BALF parameters back into the slice bitstream between the slice header and the slice data. This means that the encoder may only be able to send the slice bitstream after the coding and processing of the entire slice is finished, which may introduce buffering requirements and additional delay at the encoder.
2. If BALF parameters were located in a header element, this may require the decoder to receive the BALF parameters before it receives the slice data. But the BALF parameters will not be used by the decoder until after the entire video slice is decoded. This may therefore introduce additional buffering requirements at the decoder.

By locating BALF parameters in a footer element, rather than a header element, these issues may be avoided in some cases.

FIG. 7 is a conceptual diagram illustrating a data structure 700 of a video unit for communicating filter information consistent with one or more examples of this disclosure. In data structure 700 of FIG. 7, a modified slice bitstream structure is shown in which the BALF parameters are placed in a footer element 705, e.g., at the end of the slice. In other words, the BALF parameters (such as BALF coefficients 703 and BALF block size and flags 704) may be located after the slice header 701 and slice data 702 that includes encoded coefficients. This may be a more useful location for the BALF parameters (or any ALF or APF parameters), since such parameters will not be used until after the entire slice of video blocks are encoded or decoded. Note that, in FIG. 7, the slice header 701 may contain a 1-bit flag indicating whether BALF parameters exist in the current slice. If this flag is 0, then BALF parameters may not be included in the bitstream, and the ALF process may be avoided for that slice.

There may also be additional benefits to using data structure 700, as shown in FIG. 7. When a low-complexity combination of AIF and ALF/APF is used, some of the BALF blocks may contain only video blocks for which ApplyALFflag is set to 0 according to the decision process explained above. For these video blocks, there may be no need to send alf_blk_flag (since ALF will not be applied to such blocks). By placing the BALF parameters at the end of a slice rather than in a slice header, the decoder may determine values of ApplyALFflag for all video blocks, e.g., using the decision process of FIG. 4 or 5, as it decodes the slice data. In this manner, the decoder may know whether there is any need to decode alf_blk_flag for a given BALF block, which may lead to improved entropy coding because the bit overhead associated with sending alf_blk_flag may be reduced.

As outlined above, the techniques of this disclosure may provide for a low-complexity combination of AIF and ALF/APF. In some cases, with the presence of two adaptive filters in the video coder, each pixel may be filtered once at most, although some examples may allow for additional filtering in certain cases. For each video block, if AIF has been applied to it, then ALF/APF may be avoided. In this case, compared to the naïve combination of the two coding tools (AIF and ALF/APF) which may filter each pixel up to two times, the proposed low-complexity combination may significantly reduce the system complexity by limiting the amount of filtering that is applied to any given video block.

In some examples, when deciding whether to apply ALF/APF to a block, the video coder may consider whether there is non-zero residual information for the given video block. In particular, when there is non-zero residual information, ALF may be applied even if AIF has already been applied to the block. This case may allow the video coder to minimize the additional coding noise due to the addition of non-zero residual block, and thereby improve video quality. This alternative, however, may incur some increases in computational complexity as pixels within a slice may be filtered more than once on average, although the average number of filtering operations may still be lower than a combination of AIF and ALF/APF that simply applies ALF/APF for all blocks regardless of whether AIF were applied and regardless of whether the data comprises zero or non-zero residual information.

The data structure 70 of FIG. 7 may provide a way to communicate AIF with a BALF. As explained, data structure 70 of FIG. 7 places the BALF parameters at the end of the bitstream for a coded unit, rather than inserting it between the slice header and the slice data. This may reduce additional buffering requirements, and may enable more effective entropy coding of a syntax element (e.g, the alf_blk_flag syntax) element in BALF. During encoding/decoding of a video slice, the values of an element "ApplyALFflag" for all video blocks in the slice may be decided. Consistent with the example of FIG. 7, when BALF parameters are encoded or decoded, the alf_blk_flag syntax element for those BALF blocks that contain only video blocks with ApplyALFflag=0 will not need to be sent. Instead, the value of alf_blk_flag for such BALF blocks may be inferred to be 0. This way, bit overhead associated with alf_blk_flag may be reduced.

Figure 8:
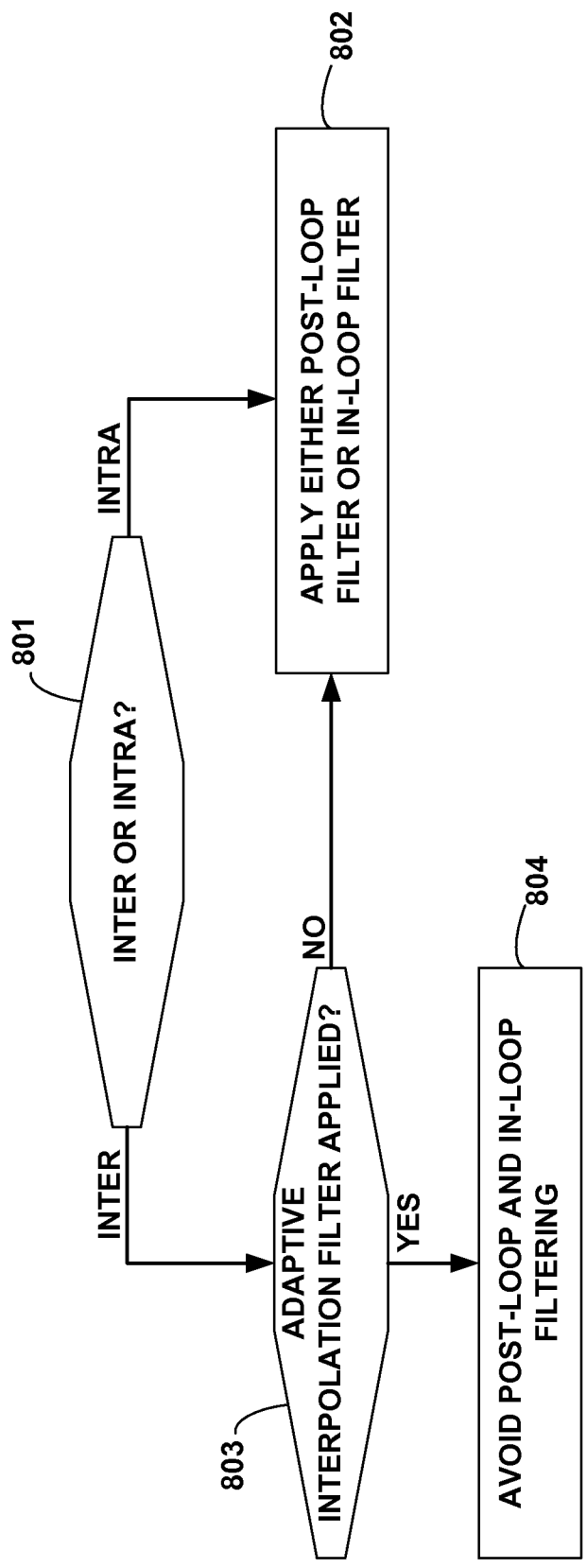
FIGS. 8-11 are different flow diagrams illustrating techniques consistent with various examples of this disclosure.

FIG. 8 is a flow diagram illustrating a technique for filtering one or more video blocks of a video unit during a video coding process consistent with one or more examples of this disclosure. FIG. 8 will be described from the perspective of video decoder 60, although similar techniques could also be applied by video encoder 50. As shown in FIG. 8, filter unit 57 of video decoder 60 determines whether a video block is inter-coded or intra-coded (801). For example, prediction unit 54 may communicate information to filter unit 57 so that filter unit 57 can make this determination. Filter unit 57 then applies a post-loop filter or an in-loop filter to the video block when the video block is intra-coded (802). When the video block is inter-coded, filter unit 57 determines whether an adaptive interpolation filter was applied during a motion compensation process with respect to the video block (803). An adaptive interpolation filter flag, such as described herein, may be included in the bitstream in order to allow decoder 60 to make determination (803).

Filter unit 57 may then determine whether to apply the post-loop filter or the in-loop filter to the video block based at least in part on whether the adaptive interpolation filter was applied. For example, as shown in FIG. 8, filter unit 57 applies a post-loop filter or an in-loop filter to the video block (802) when the video block is inter-coded, but an adaptive interpolation filter was not applied during the motion compensation process ("no" of 803). However, filter unit 57 avoids post-loop and in-loop filtering to the video block (804) when the video block is inter-coded, and an adaptive interpolation filter was applied during the motion compensation process ("yes" of 803). In some cases, in the example of FIG. 8, only one type of filtering from the set of adaptive interpolation filtering, post-loop filtering and in-loop filtering, is applied with respect to any given video block.

Figure 9:
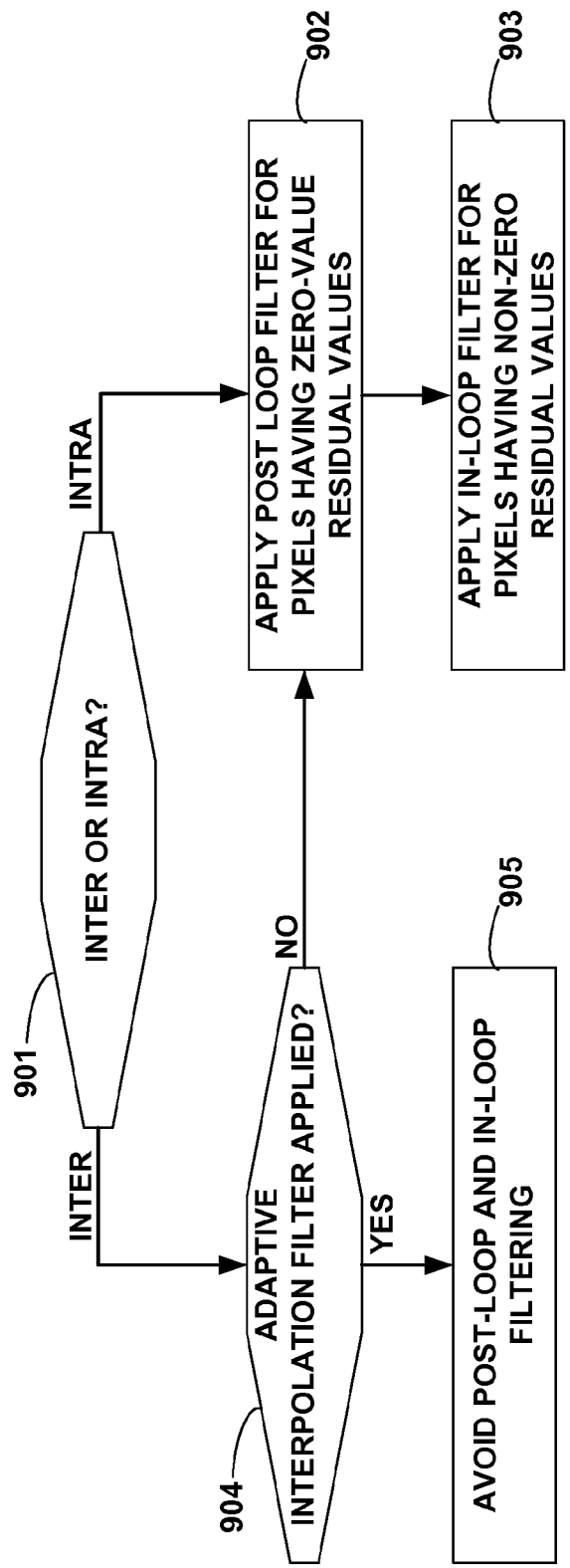

FIG. 9 is another flow diagram illustrating a technique for filtering one or more video blocks of a video unit during a video coding process consistent with one or more examples of this disclosure. FIG. 9 will be described from the perspective of video decoder 60, although similar techniques could also be applied by video encoder 50. As shown in FIG. 9, filter unit 57 of video decoder 60 determines whether a video block is inter-coded or intra-coded (901). For example, prediction unit 54 may communicate information to filter unit 57 so that filter unit 57 can make this determination. If the video block is intra-coded ("INTRA" 901), filter unit 57 applies a post loop filter 66 for pixel values having zero-value residual values (902), and applies an in-loop filter 68 for pixel values having non-zero residual values (903). In this way, filter unit 57 makes pixel-level determinations of whether to apply post loop filter 66 or in-loop filter 68 based on whether such pixels are defined by non-zero residual values.

In the process of FIG. 9, when the video block is inter-coded ("INTER" 901), filter unit 57 determines whether an adaptive interpolation filter was applied during a motion compensation process with respect to the video block (903). Filter unit 57 may then determine whether to apply the post-loop filter or the in-loop filter to the video block based at least in part on whether the adaptive interpolation filter was applied. For example, as shown in FIG. 9, if filter unit 57 determines that an adaptive interpolation filter was not applied during the motion compensation process ("no" of 903), filter unit 57 applies a post loop filter 66 for pixel values having zero-value residual values (902), and applies an in-loop filter 68 for pixel values having non-zero residual values (903). On the other hand, filter unit 57 avoids post-loop and in-loop filtering to the video block (905) when the video block is inter-coded, and an adaptive interpolation filter was applied during the motion compensation process ("yes" of 904).

Figure 10:
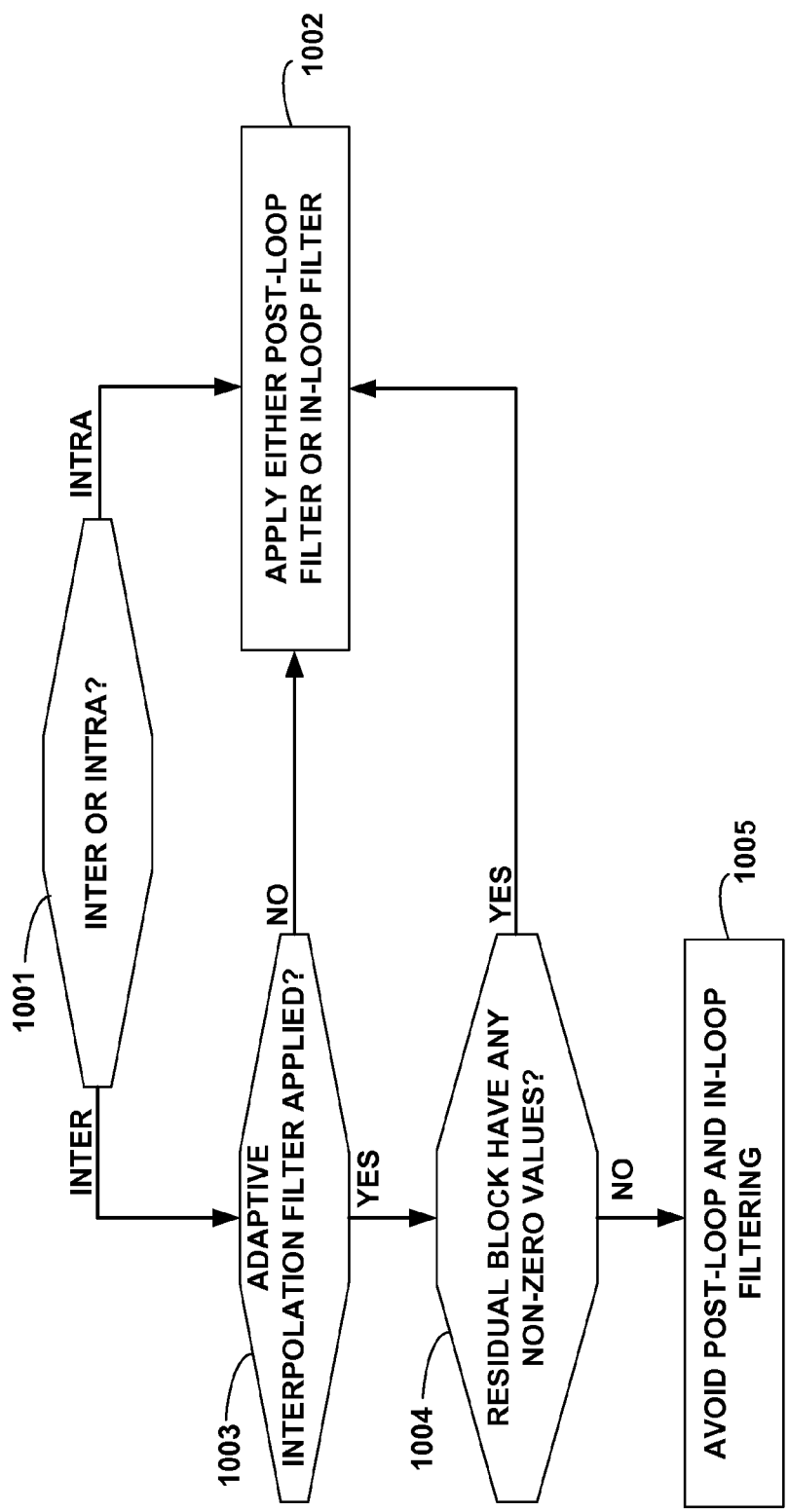

FIG. 10 is another flow diagram illustrating a technique for filtering one or more video blocks of a video unit during a video coding process consistent with one or more examples of this disclosure. FIG. 10 will also be described from the perspective of video decoder 60, although similar techniques could also be applied by video encoder 50. As shown in FIG. 10, filter unit 57 of video decoder 60 determines whether a video block is inter-coded or intra-coded (1001). Again, prediction unit 54 may communicate information to filter unit 57 so that filter unit 57 can make this determination. If the video block is intra-coded ("INTRA" 1001), filter unit 57 applies a post-loop filter or an in-loop filter to the video block (1002). When the video block is inter-coded (1001), filter unit 57 determines whether an adaptive interpolation filter was applied during a motion compensation process with respect to the video block (1003). Filter unit 57 may then determine whether to apply the post-loop filter or the in-loop filter to the video block based at least in part on whether the adaptive interpolation filter was applied. For example, as shown in FIG. 10, filter unit 57 applies a post-loop filter or an in-loop filter to the video block (1002) when the video block is inter-coded, but an adaptive interpolation filter was not applied during the motion compensation process ("no" of 1003).

In the technique of FIG. 10, if an adaptive interpolation filter was applied during the motion compensation process for an inter-coded video block ("yes" of 1003), filter unit 57 makes yet another determination. In particular, filter unit 57 determines whether a residual block has any non-zero residual values (1004). If so ("yes" 1004), filter unit 57 may still apply the post-loop filter or the in-loop filter to the video block (1002), possibly filtering only the non-zero residual values or possibly filtering non-zero residual values with post-loop filter 66 and zero-value residual values with in-loop filter 67. However, in this example, if filter unit 57 determines that a residual block does not have any non-zero residual values ("no" 1004), filter unit 57 may avoid post loop filtering and in-loop filtering (1005).

Figure 11:
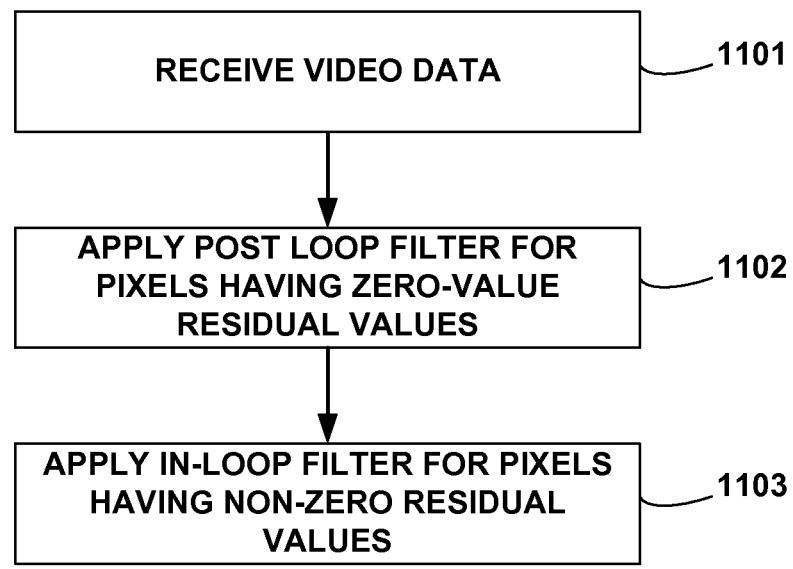

FIG. 11 is a flow diagram illustrating a technique that may be performed by a video decoder 60 in order to select between post-loop filter 66 and in-loop filter 67 based on the data in the bitstream. In other words, the technique of FIG. 11 may not require any filtering syntax information in the bitstream in order to facilitate such selections between post-loop filter 66 and in-loop filter 67.

As shown in FIG. 11, video decoder 60 receives video data (1101), which includes residual video blocks that are reconstructed by video decoder via predictive video decoding techniques. In this case, following video block reconstruction as described herein, filter unit 57 applies post-loop filter 66 for pixels of reconstructed video blocks that are defined by residual values of zero in the residual video blocks (1102). Filter unit 67 applies in-loop filtering for pixels of the reconstructed video blocks that are defined by zero-value residual values of the residual video blocks (1103). Again, the technique of FIG. 11 may not require any filtering syntax information in the bitstream in order to facilitate such selections between post-loop filter 66 and in-loop filter 67.

As explained, various techniques of this disclosure may be performed by a video encoder or by a video decoder. If the techniques are performed during a video encoding process, the techniques may also comprise the encoding of syntax elements into an encoded bitstream for the video unit to indicate whether the post-loop filter or the in-loop filter should be applied to each of the video blocks of the coded unit. As outlined above, in this case, the encoding of the syntax elements into the encoded bitstream for the video unit may comprise encoding the syntax elements into a footer element that follows coefficients for the video unit.

In some examples, applying the post-loop filter or the in-loop filter may include selecting between the post-loop filter and the in-loop filter. However, in other examples, the application of the post-loop filter or the in-loop filter may depend on other factors, such as whether the block or whether specific pixels of the block are defined by non-zero residual values. In some cases, the post-loop filter is applied for pixels of the video block associated with zero-value residual values, and the in-loop filter is applied for pixels of the video block associated with non-zero residual values. Indeed, this concept (such as shown in FIG. 11), may itself provide advantages, and may be used independently of the other techniques described herein.

If the technique are performed during a video decoding process, the techniques may also comprise decoding syntax elements from a received bitstream for the video unit, wherein the syntax elements indicate whether the post-loop filter or the in-loop filter should be applied for at least some of the video blocks of the coded unit. However, as explained above, with the example of FIG. 11, such syntax elements may be eliminated from the bitstream. If syntax elements are included in the bitstream, the syntax elements may be located in a footer element that follows coefficients for the video unit, as explained herein.

The techniques of this disclosure may be realized in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials.

The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

The invention claimed is:

1. A method of filtering one or more video blocks of a video unit during a video coding process, the method comprising:
   determining whether an adaptive interpolation filter was applied during a motion compensation process with respect to the video block;
   determining whether to apply a post-loop filter or an in-loop filter to the video block based at least in part on whether the adaptive interpolation filter was applied;
   applying the post-loop filter or the in-loop filter to the video block when the video block is formed from a prediction block and a residual block that includes at least some non-zero residual values; and
   skipping application of the post-loop filter or the in-loop filter to the video block when the video block is formed from a prediction block and a residual block that does not include any non-zero residual values.

2. The method of claim 1, wherein the method is performed during a video encoding process, the method further comprising encoding syntax elements into an encoded bitstream for the video unit to indicate whether the post-loop filter or the in-loop filter should be applied to each of the video blocks of the coded unit.

3. The method of claim 2, wherein encoding the syntax elements into the encoded bitstream for the video unit comprises encoding the syntax elements into a footer element that follows coefficients for the video unit.

4. The method of claim 1, wherein applying the post-loop filter or the in-loop filter includes selecting between the post-loop filter and the in-loop filter.

5. A method of filtering one or more video blocks of a video unit during a video coding process, the method comprising:
   determining whether to apply a post-loop filter or the in-loop filter to a video block based at least in part on whether an adaptive interpolation filter was applied;
   applying the post-loop filter for pixels of the video block associated with zero-value residual values; and
   applying the in-loop filter for pixels of the video block associated with non-zero residual values.

6. The method of claim 1, wherein the method is performed during a video decoding process, the method further comprising decoding syntax elements from a received bitstream for the video unit, wherein the syntax elements indicate whether the post-loop filter or the in-loop filter should be applied for at least some of the video blocks of the coded unit.

7. The method of claim 6, wherein the syntax elements are located in a footer element that follows coefficients for the video unit.

8. A video coder apparatus that filters one or more video blocks of a video unit during a video coding process, the video coder apparatus comprising:
   an adaptive interpolation filter;
   a post-loop filter; and
   an in-loop filter, wherein the apparatus:
      determines whether the adaptive interpolation filter was applied during a motion compensation process with respect to the video block;
      determines whether to apply the post-loop filter or the in-loop filter to the video block based at least in part on whether the adaptive interpolation filter was applied;
      applies the post-loop filter or the in-loop filter to the video block when the video block is formed from a prediction block and a residual block that includes at least some non-zero residual values; and
      skips application of the post-loop filter or the in-loop filter to the video block when the video block is formed from a prediction block and a residual block that does not include any non-zero residual values.

9. The video coder apparatus of claim 8, wherein the video coder apparatus comprises a video encoder, wherein the video coder apparatus encodes syntax elements into an encoded bitstream for the video unit to indicate whether the post-loop filter or the in-loop filter should be applied to each of the video blocks of the coded unit.

10. The video coder apparatus of claim 9, wherein the video coder apparatus encodes the syntax elements into a footer element that follows coefficients for the video unit.

11. The video coder apparatus of claim 8, wherein in applying the post-loop filter or the in-loop filter, the video coder apparatus selects between the post-loop filter and the in-loop filter.

12. A video coder apparatus that filters one or more video blocks of a video unit during a video coding process, the video coder apparatus comprising:
   an adaptive interpolation filter;
   a post-loop filter; and
   an in-loop filter, wherein the apparatus:
      determines whether the adaptive interpolation filter was applied during a motion compensation process with respect to the video block;
      determines whether to apply the post-loop filter or the in-loop filter to the video block based at least in part on whether the adaptive interpolation filter was applied;
      applies the post-loop filter for pixels of the video block associated with zero-value residual values; and applies the in-loop filter for pixels of the video block associated with non-zero residual values.

13. The video coder apparatus of claim 8, wherein the video coder apparatus comprises a video decoder, wherein the video coder apparatus decodes syntax elements from a received bitstream for the video unit, wherein the syntax elements indicate whether the post-loop filter or the in-loop filter should be applied for at least some of the video blocks of the coded unit.

14. The video coder apparatus of claim 13, wherein the syntax elements are located in a footer element that follows coefficients for the video unit.

15. The video coder apparatus of claim 8, wherein the apparatus comprises at least one of:
an integrated circuit;
a microprocessor,
a wireless communication device that includes a video encoder, and
a wireless communication device that includes a video decoder.

16. A device that filters one or more video blocks of a video unit during a video coding process, the device comprising:
means for determining whether an adaptive interpolation filter was applied during a motion compensation process with respect to the video block;
means for determining whether to apply the post-loop filter or the in-loop filter to the video block based at least in part on whether the adaptive interpolation filter was applied;
means for applying the post-loop filter or the in-loop filter to the video block when the video block is formed from a prediction block and a residual block that includes at least some non-zero residual values; and
means for skipping application of the post-loop filter or the in-loop filter to the video block when the video block is formed from a prediction block and a residual block that does not include any non-zero residual values.

17. The device of claim 16, wherein the device comprises a video encoding device, the device further comprising means for encoding syntax elements into an encoded bitstream for the video unit to indicate whether the post-loop filter or the in-loop filter should be applied to each of the video blocks of the coded unit.

18. The device of claim 17, wherein the means for encoding the syntax elements into the encoded bitstream for the video unit comprises means for encoding the syntax elements into a footer element that follows coefficients for the video unit.

19. The device of claim 16, wherein the means for applying the post-loop filter or the in-loop filter includes means for selecting between the post-loop filter and the in-loop filter.

20. A device that filters one or more video blocks of a video unit during a video coding process, the device comprising:
means for determining whether an adaptive interpolation filter was applied during a motion compensation process with respect to the video block;
means for determining whether to apply a post-loop filter or an in-loop filter to the video block based at least in part on whether the adaptive interpolation filter was applied;
means for applying the post-loop filter for pixels of the video block associated with zero-value residual values; and
means for applying the in-loop filter for pixels of the video block associated with non-zero residual values.

21. The device of claim 16, wherein the device comprises a video decoding device, the device further comprising means for decoding syntax elements from a received bitstream for the video unit, wherein the syntax elements indicate whether the post-loop filter or the in-loop filter should be applied for at least some of the video blocks of the coded unit.

22. The device of claim 21, wherein the syntax elements are located in a footer element that follows coefficients for the video unit.

23. A non-transitory computer-readable storage medium comprising instructions that upon execution in a processor cause the processor to filter one or more video blocks of a video unit during a video coding process, wherein the instructions cause the processor to:
determine whether an adaptive interpolation filter was applied during a motion compensation process with respect to the video block; and
determine whether to apply the post-loop filter or the in-loop filter to the video block based at least in part on whether the adaptive interpolation filter was applied;
apply the post-loop filter or the in-loop filter to the video block when the video block is formed from a prediction block and a residual block that includes at least some non-zero residual values; and
skip application of the post-loop filter or the in-loop filter to the video block when the video block is formed from a prediction block and a residual block that does not include any non-zero residual values.

24. The non-transitory computer-readable storage medium of claim 23, wherein the instructions cause the processor to perform a video encoding process and wherein the instructions cause the processor to encode syntax elements into an encoded bitstream for the video unit to indicate whether the post-loop filter or the in-loop filter should be applied to each of the video blocks of the coded unit.

25. The non-transitory computer-readable storage medium of claim 24, wherein in encoding the syntax elements into the encoded bitstream for the video unit, the instructions cause the processor to encode the syntax elements into a footer element that follows coefficients for the video unit.

26. The non-transitory computer-readable storage medium of claim 23, wherein in applying the post-loop filter or the in-loop filter, the instructions cause the processor to select between the post-loop filter and the in-loop filter.

27. A non-transitory computer-readable storage medium comprising instructions that upon execution in a processor cause the processor to filter one or more video blocks of a video unit during a video coding process, wherein the instructions cause the processor to:
determine whether an adaptive interpolation filter was applied during a motion compensation process with respect to the video block;
determine whether to apply a post-loop filter or an in-loop filter to the video block based at least in part on whether the adaptive interpolation filter was applied;
apply the post-loop filter for pixels of the video block associated with zero-value residual values; and
apply the in-loop filter for pixels of the video block associated with non-zero residual values.

28. The non-transitory computer-readable storage medium of claim 23, wherein the instructions cause the processor to perform a video decoding process and wherein the instructions cause the processor to decode syntax elements from a received bitstream for the video unit, wherein the syntax elements indicate whether the post-loop filter or the in-loop filter should be applied for at least some of the video blocks of the coded unit.

29. The non-transitory computer-readable storage medium of claim 28, wherein the syntax elements are located in a footer element that follows coefficients for the video unit.

30. A method comprising:
  receiving video data at a video decoder, wherein the video data includes residual video blocks;
  applying post-loop filtering for pixels of reconstructed video blocks that are defined by non-zero residual values of the residual video blocks; and
  applying in-loop filtering for pixels of the reconstructed video blocks that are defined by zero-value residual values of the residual video blocks.

31. The method of claim 5, further comprising applying only one of the adaptive interpolation filter, the post-loop filter and the in-loop filter to each of the video blocks of the video unit.

32. The method of claim 5, further comprising applying the post-loop filter or the in-loop filter to the video block only when the adaptive interpolation filter was not applied during the motion compensation process with respect to the video block.

33. The video coder apparatus of claim 12, wherein the video coder apparatus applies only one of the adaptive interpolation filter, the post-loop filter and the in-loop filter to each of the video blocks of the video unit.

34. The video coder apparatus of claim 12, wherein the video coder apparatus applies the post-loop filter or the in-loop filter to the video block only when the adaptive interpolation filter was not applied during the motion compensation process with respect to the video block.

35. The device of claim 20, further comprising means for applying only one of the adaptive interpolation filter, the post-loop filter and the in-loop filter to each of the video blocks of the video unit.

36. The device of claim 20, further comprising means for applying the post-loop filter or the in-loop filter to the video block only when the adaptive interpolation filter was not applied during the motion compensation process with respect to the video block.

37. The non-transitory computer-readable storage medium of claim 27, wherein the instructions cause the processor to apply only one of the adaptive interpolation filter, the post-loop filter and the in-loop filter to each of the video blocks of the video unit.

38. The non-transitory computer-readable storage medium of claim 27, wherein the instructions cause the processor to apply the post-loop filter or the in-loop filter to the video block only when the adaptive interpolation filter was not applied during the motion compensation process with respect to the video block.

* * * * *